(12) United States Patent
Gruskin

(10) Patent No.: US 11,641,809 B2
(45) Date of Patent: May 9, 2023

(54) INFLATABLE GROW TENT WITH INTEGRATED LIGHTING

(71) Applicant: Poseidon Reef Systems LLC, Malvern, PA (US)

(72) Inventor: Elliott Gruskin, Malvern, PA (US)

( * ) Notice: Subject to any disclaimer, the term of this patent is extended or adjusted under 35 U.S.C. 154(b) by 211 days.

(21) Appl. No.: 17/072,881

(22) Filed: Oct. 16, 2020

(65) Prior Publication Data
US 2021/0112729 A1  Apr. 22, 2021

Related U.S. Application Data

(60) Provisional application No. 62/915,957, filed on Oct. 16, 2019.

(51) Int. Cl.
*A01G 9/16* (2006.01)
*A01G 9/14* (2006.01)
*A01G 9/24* (2006.01)

(52) U.S. Cl.
CPC .............. *A01G 9/16* (2013.01); *A01G 9/1407* (2013.01); *A01G 9/1438* (2013.01); *A01G 9/249* (2019.05); *A01G 2009/1453* (2013.01)

(58) Field of Classification Search
CPC ...................................................... A01G 9/16
See application file for complete search history.

(56) References Cited

U.S. PATENT DOCUMENTS

| | | | | |
|---|---|---|---|---|
| 2,823,683 A | * | 2/1958 | Smith | E04B 1/34357 135/906 |
| 3,791,076 A | * | 2/1974 | Gahler | F16B 5/0692 52/63 |
| 3,830,033 A | * | 8/1974 | Gahler | E04B 1/32 160/391 |
| 3,930,344 A | * | 1/1976 | Gahler | E04H 15/64 52/63 |
| 4,274,234 A | * | 6/1981 | Abell | A01G 9/1415 52/273 |
| 4,381,629 A | * | 5/1983 | Ahn | E04B 1/34368 135/92 |
| 4,679,350 A | * | 7/1987 | Banta | A01G 13/0231 47/21.1 |
| 5,433,030 A | * | 7/1995 | Lehman | A01G 9/16 47/17 |
| 5,479,744 A | * | 1/1996 | Meyer | A01G 9/16 52/63 |
| 5,598,668 A | * | 2/1997 | Isom | E04B 1/3205 52/81.3 |
| 2002/0059749 A1 | * | 5/2002 | Williams | A01G 9/16 47/17 |
| 2003/0070353 A1 | * | 4/2003 | Mercurio | A01G 9/242 47/17 |

(Continued)

*Primary Examiner* — Jessica B Wong
(74) *Attorney, Agent, or Firm* — Farber LLC

(57) ABSTRACT

Self-supporting inflatable grow tents include a base surface, a top surface, and a plurality of sidewalls. The sidewalls include an integrated lighting system. The inflatable grow tents include a plurality of support members configured to structurally support the grow tent when inflated, and an air circulation assembly including an air blower and a carbon filter. The grow tents include a lighting system configured to provide a standard deviation of average photosynthetic active radiation that is from about 2 to about 8 within the grow tent when the lighting system is active.

16 Claims, 18 Drawing Sheets

(56) References Cited

U.S. PATENT DOCUMENTS

| | | | | |
|---|---|---|---|---|
| 2004/0206013 A1* | 10/2004 | Berg | ................. | A01G 9/16 52/63 |
| 2005/0034367 A1* | 2/2005 | Morrow | ................. | A01G 9/16 47/65.5 |
| 2008/0191501 A1* | 8/2008 | Monahan | ................. | A01G 20/43 294/214 |
| 2008/0216398 A1* | 9/2008 | Townsley | ................. | A01G 9/16 47/17 |
| 2010/0236142 A1* | 9/2010 | Drewry | ................. | A01G 9/16 47/29.1 |
| 2011/0099895 A1* | 5/2011 | Berghoff | ................. | A01G 9/249 362/228 |
| 2016/0157439 A1* | 6/2016 | Greene | ................. | A01G 9/24 47/17 |
| 2018/0177167 A1* | 6/2018 | Topping | ................. | A01G 22/60 |

* cited by examiner

PAR VALUES AT THE BASE OF THE GROW TENT INTEGRATED LEDS

| 55 | 60 | 61 | 57 |
|----|----|----|----|
| 56 | 61 | 62 | 58 |
| 56 | 60 | 60 | 56 |
| 57 | 61 | 59 | 55 |

AVERAGE 58
STDEV 2.4

INCANDESCENT LIGHT

| 14 | 15 | 15 | 12 |
|----|----|----|----|
| 16 | 20 | 19 | 16 |
| 16 | 21 | 23 | 20 |
| 15 | 18 | 18 | 16 |

AVERAGE 17
STDEV 2.9

PAR MEASUREMENTS AT THE BASE OF THE GROW TENT

FIG. 6

PAR VALUES 12 INCHES FROM THE BASE OF THE TENT INTEGRATED LEDS

| 67 | 73 | 72 | 68 |
|----|----|----|----|
| 68 | 74 | 74 | 69 |
| 70 | 74 | 73 | 66 |
| 71 | 76 | 74 | 67 |

AVERAGE 71
STDEV 3.2

INCANDESCENT LIGHT

| 18 | 18 | 17 | 15 |
|----|----|----|----|
| 19 | 20 | 21 | 20 |
| 18 | 22 | 24 | 22 |
| 17 | 21 | 21 | 18 |

AVERAGE 19
STDEV 2.3

TABLE 2: PAR MEASUREMENTS 12 INCHES ABOVE THE BASE OF THE GROW TENT

FIG. 7

PAR VALUES 24 INCHES FROM THE
BASE OF THE TENT INTEGRATED LEDS

| 77 | 85 | 85 | 87 |
|----|----|----|----|
| 74 | 81 | 82 | 79 |
| 74 | 79 | 79 | 73 |
| 72 | 83 | 83 | 75 |

AVERAGE  79
STDEV    4.7

INCANDESCENT LIGHT

| 21 | 20 | 19 | 17 |
|----|----|----|----|
| 20 | 23 | 24 | 24 |
| 19 | 25 | 27 | 23 |
| 19 | 23 | 23 | 19 |

AVERAGE  22
STDEV    2.8

TABLE 3: PAR MEASUREMENTS 24 INCHES ABOVE THE BASE OF THE GROW TENT

FIG. 8

PAR VALUES 36 INCHES FROM THE
BASE OF THE TENT INTEGRATED LEDS

| 75 | 85 | 85 | 87 |
|----|----|----|----|
| 74 | 81 | 81 | 78 |
| 74 | 79 | 79 | 74 |
| 78 | 83 | 83 | 76 |

AVERAGE  80
STDEV    4.3

INCANDESCENT LIGHT

| 27 | 33 | 28 | 24 |
|----|----|----|----|
| 27 | 35 | 39 | 30 |
| 21 | 33 | 38 | 30 |
| 17 | 24 | 26 | 19 |

AVERAGE  28
STDEV    6.4

TABLE 3: PAR MEASUREMENTS 36 INCHES ABOVE THE BASE OF THE GROW TENT

FIG. 9

PAR VALUES 48 INCHES FROM THE
BASE OF THE TENT INTEGRATED LEDS

| 76 | 90 | 85 | 90 |
|----|----|----|----|
| 71 | 84 | 83 | 81 |
| 68 | 79 | 77 | 73 |
| 73 | 76 | 79 | 75 |

AVERAGE  78.5
STDEV    6.5

INCANDESCENT LIGHT

| 16 | 17 | 36  | 18 |
|----|----|-----|----|
| 15 | 57 | 68  | 44 |
| 15 | 78 | 148 | 37 |
| 11 | 39 | 35  | 19 |

AVERAGE  41
STDEV    35

TABLE 4: PAR MEASUREMENTS 48 INCHES ABOVE THE BASE OF THE GROW TENT

INFLATABLE GROW TENT WITH INTEGRATED LIGHTING

BACKGROUND

Traditional agricultural methods are labor intensive, land intensive, and dependent on local climate and weather conditions. Various indoor farming technologies have been developed to address these problems to produce yields in controlled environments.

Often times, grow tents provide a suitable enclosure for growing plants indoors. However, due to complex frameworks, lighting systems, air handling equipment, and associated cables and tubes, grow tents are multi-component systems that can take considerable time to set up. It would be desirable to manufacture inflatable grow tents that require minimal effort from a user to setup.

It would also be desirable to provide for a lighting system configured to provide an optimal distribution of light within a grow tent.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

In one aspect, the present disclosure relates to inflatable grow tents having a base surface, a top surface, and a plurality of sidewalls. The sidewalls include an integrated light system including a plurality of support members configured to structurally support the grow tent when inflated. The inflatable grow tent further includes an air circulation assembly including an air blower and a carbon filter. The inflatable grow tent is self-supporting.

In certain embodiments, the plurality of support members are poles. In embodiments, the sidewalls have an exterior made from canvas. In other embodiments, the sidewalls have an interior that is reflective. In certain embodiments, the interior of the sidewalls includes mylar.

In embodiments, the lighting system includes LED lights. In certain embodiments, the LED lights in the lighting system form strips of LED lights.

In another aspect, the present disclosure relates to inflatable grow tents having a base surface, a top surface, and a plurality of sidewalls. The sidewalls include an integrated light system including a plurality of support members configured to structurally support the grow tent when inflated. The inflatable grow tent further includes an air circulation assembly including an air blower and a carbon filter. The inflatable grow tent is self-supporting and includes an integrated lighting system configured to provide a standard deviation of average photosynthetic active radiation that is from about 2 to about 8 within the grow tent when the lighting system is active.

In certain embodiments, the plurality of support members are poles. In embodiments, the sidewalls have an exterior made from canvas. In other embodiments, the sidewalls have an interior that is reflective. In certain embodiments, the interior of the sidewalls includes mylar.

In embodiments, the lighting system includes LED lights. In certain embodiments, the LED lights in the lighting system form strips of LED lights.

In embodiments, the plurality of support members form a frame external of the plurality of sidewalls. In embodiments, the plurality of support members are tubular conduits. In certain embodiments, the plurality of support members are connected by a plurality of connectors.

In embodiments, the inflatable grow tent further includes an accessory attachment member positioned adjacent an exterior of one of the plurality of sidewalls. The accessory attachment member may include a metal plate and a support configured to receive the tubular conduit therethrough.

In embodiments, the inflatable grow tent further includes an accessory positioned adjacent an interior of the one of the plurality of sidewalls in alignment with the accessory attachment member. The accessory may include a magnetic portion configured to attach to the metal plate of the accessory attachment member. In certain embodiments, the accessory includes a hook.

BRIEF DESCRIPTION OF THE DRAWINGS

FIGS. 6-10 are tables depicting photosynthetic active radiation data for a grow tent in accordance with an illustrative embodiment of the present disclosure having an integrated LED lighting system compared to an incandescent lighting system at varying distances from the base of the grow tent;

FIG. 11 is a graph depicting average light intensity data for a grow tent in accordance with an illustrative embodiment of the present disclosure having LED lighting compared to known incandescent lighting at varying distances from the base of the grow tent;

DETAILED DESCRIPTION

Particular embodiments of the inflatable grow tents are described herein below. However, it is to be understood that the disclosed embodiments are merely exemplary of the disclosure and may be embodied in various forms. Therefore, specific details disclosed herein are not to be interpreted as limiting, but merely as a basis for the claims and as a representative basis for teaching one skilled in the art to variously employ the present disclosure in virtually any appropriately detailed structure. Well-known functions are not described in detail to avoid obscuring the present disclosure in unnecessary detail.

Figure 1:
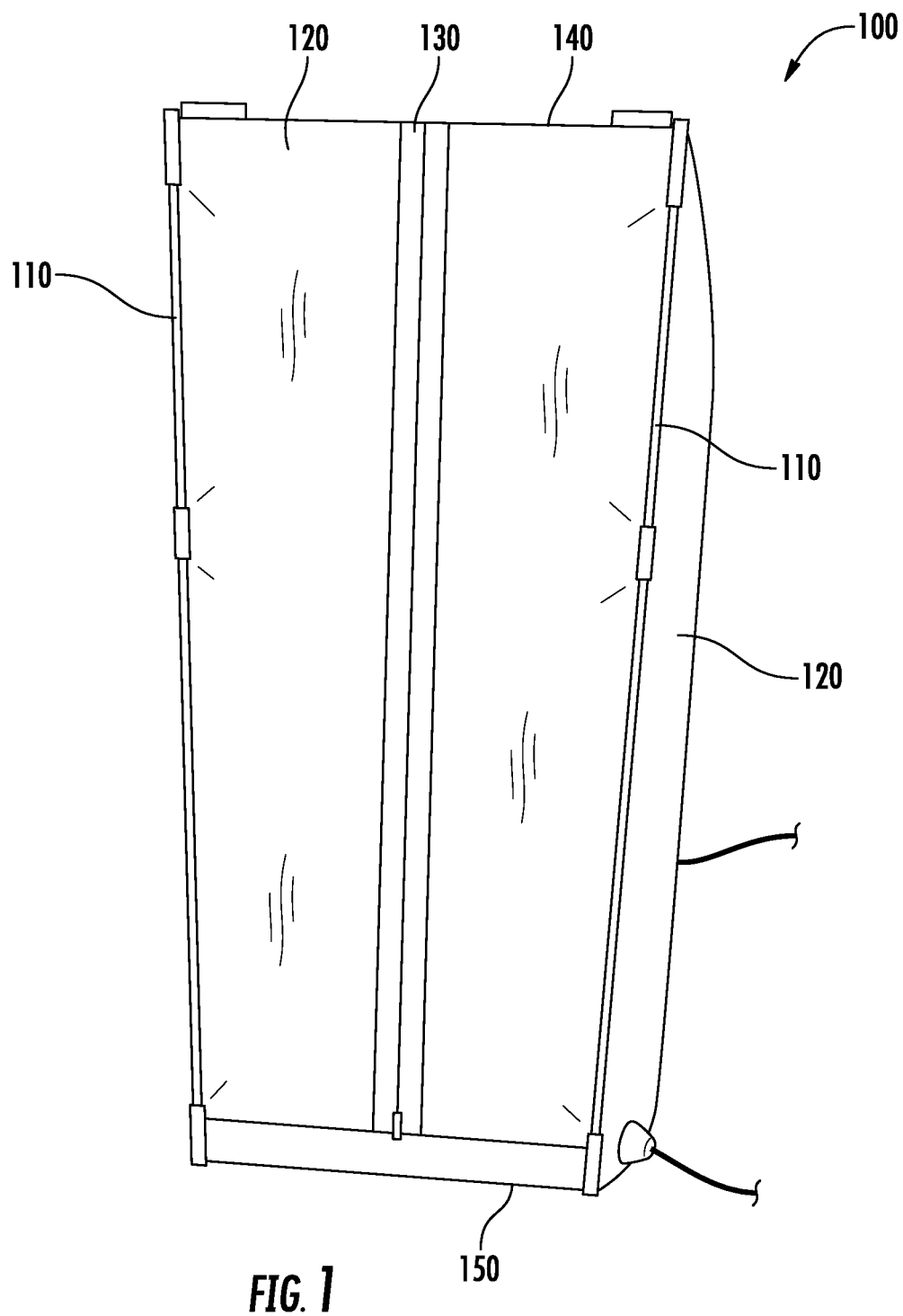
FIG. 1 is a front view of a grow tent in accordance with an illustrative embodiment of the present disclosure.

As seen in FIG. 1, the present grow tent 100 includes support members 110, sidewalls 120, zipper 130, top surface 140, and base surface 150. In embodiments, sidewalls 120, top surface 140, and base surface 150 may be made from any suitable material that is light enough to be easily inflated and supported by support members 110 (also referred to herein as "support poles 110". In embodiments, support members 110 may be support poles. In embodiments, sidewalls 120, top surface 140, and base surface 150 may be Mylar-backed canvas, having the reflective Mylar material facing the inside of grow tent 100. In embodiments, grow tent 100 is a rectangular prism, however, other desired shapes may be used with designs in accordance with the present disclosure. Sidewalls 120 and top surface 140 are supported by support poles 110. Support poles 110 may include an inner shock cord surrounded by a flexible layer. Support poles may be made from plastics, or any suitable material with the requisite strength to support grow tent 100 and its contents when inflated. Support poles 110 may be present on the exterior edges of sidewalls 120, top surface 140, and base surface 150. Support poles 110 may be secured to sidewalls 120, top surface 140, and base surface 150 by any suitable means. For example, in one embodiment, the support poles 110 may be inserted into fabric pockets or loops (not shown) formed on each corner of sidewalls 120, top surface 140, and base surface 150. In embodiments, support poles 110 may only be included along the vertical edges 122 of sidewalls 120 and along two edges of top surface 140. In another embodiment, two support poles may form an "X" shapes along top surface 140. In other words, the number and configuration of support poles 110 may be modified so long as the structural integrity and self-supporting nature of grow tent 100 remains intact. In addition to providing structural integrity, support poles 110 ensure grow tent 100 does not collapse in the event of power failure.

Figure 1A:
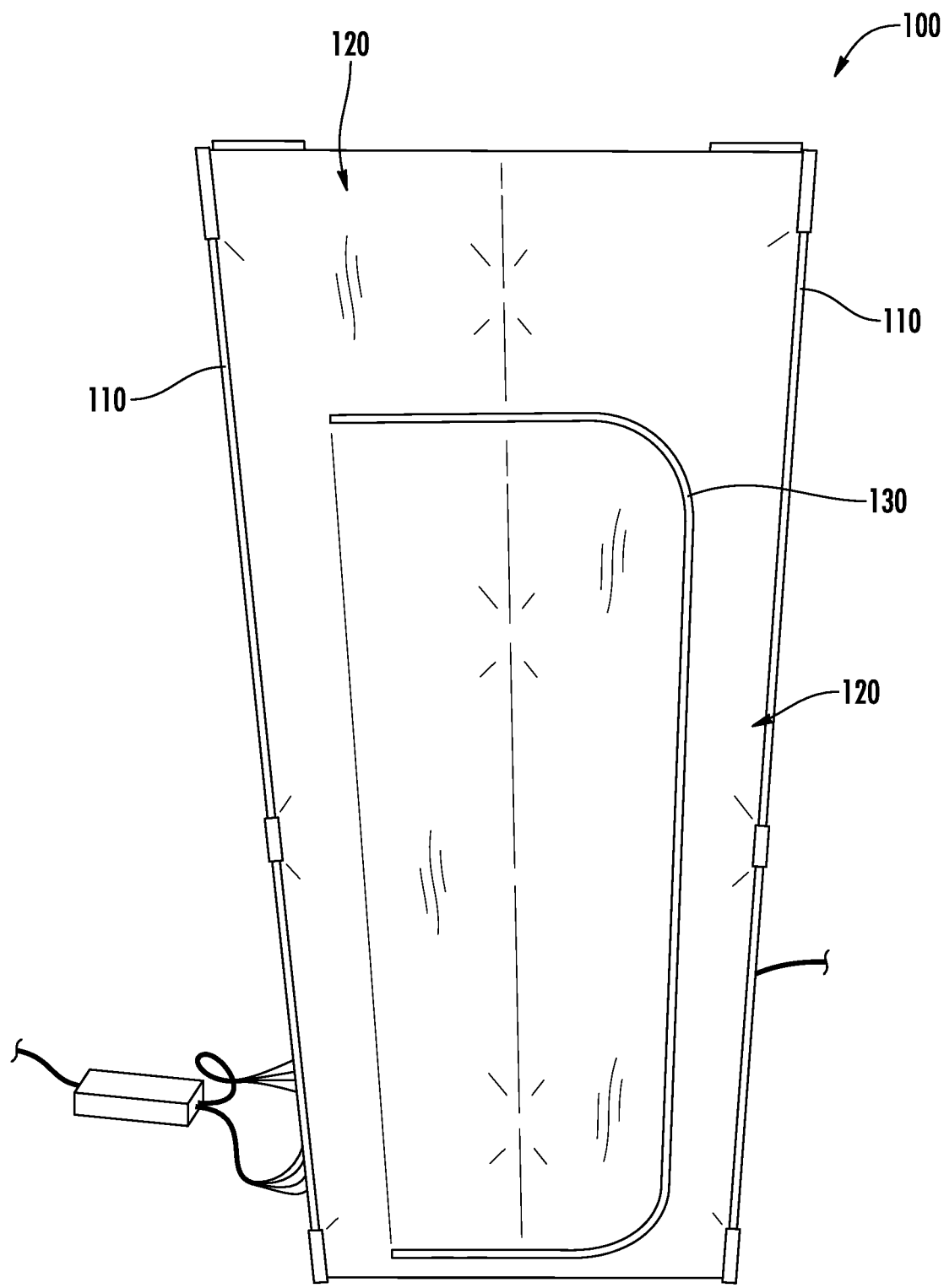
FIG. 1A is a front view of a grow tent in accordance with another illustrative embodiment of the present disclosure.

Grow tent 100 further includes a zipper 130 extending vertically along a substantially central portion of a desired sidewall 120. Zipper 130 provides a mechanism by which a user may enter grow tent 100, while also ensuring grow tent 100 is sealed in a substantially airtight fashion. In embodiments zipper 130 extends along a sidewall 120 on the front side of grow tent 100, such that the entryway to grow tent 100 provided by zipper 130 is isolated from other components of grow tent 100. In alternative embodiments, as shown in FIG. 1A, zipper 130 may be substantially C-shaped, allowing for easier access into grow tent 100.

Figure 2:
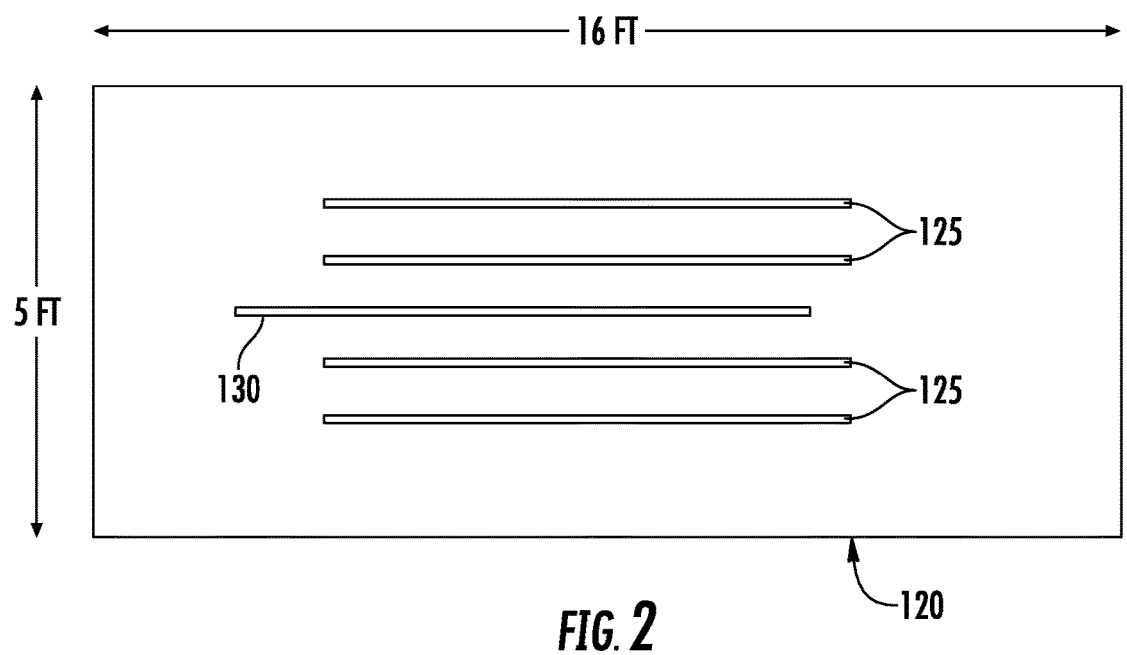
FIG. 2 depicts a diagrammatic view of a sidewall of a grow tent in accordance with an illustrative embodiment of the present disclosure.
Figure 3:
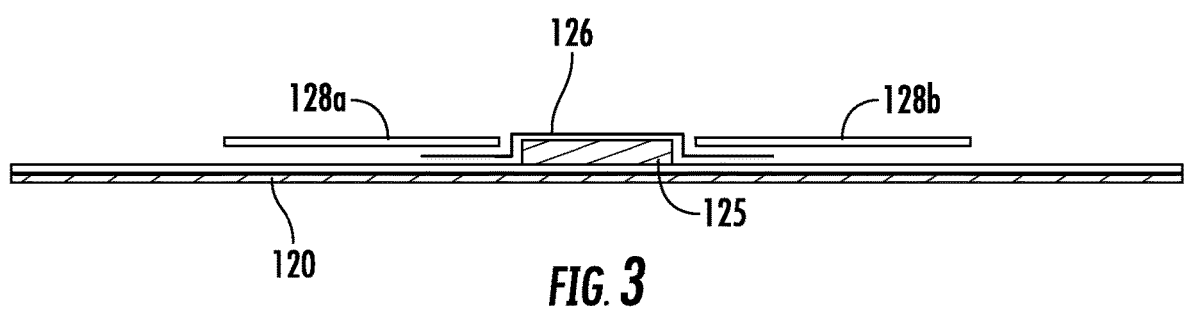
FIG. 3 depicts a diagrammatic cross-sectional view of a sidewall of a grow tent in accordance with an illustrative embodiment of the present disclosure.

FIGS. 2 and 3 show diagrammatic views of a sidewall 120 of a grow tent 100 in accordance with an illustrative embodiment of the present disclosure. In FIG. 2, the sidewall 120 is on the front of grow tent 100 and includes zipper 130. A series of light strips 125 extend along sidewall 120 and may be substantially parallel to zipper 130. Light strips 125 may be LED lights, and may be secured to sidewalls 120 using a suitable adhesive, or any other suitable securing means. LED's are desirable as they are lightweight and are decreasing in cost over time. In embodiments, there may be two light strips on either side of zipper 130 on the front side of grow tent 100. As shown in the cross-sectional view depicted in FIG. 3, light strips 125 may be secured directly to the Mylar (inside) side of sidewalls 120. In embodiments, a water-resistant or waterproof seal 126 may cover light strips 125. In embodiments, seal 126 may be clear tape. A first end of reflective metal tape 128a is then secured to Mylar sidewall 120, while a second end of reflective metal tape 128b is secured to seal 126. Thus, reflective metal tape 128a, 128b further secures seal 126 to light strips 125 and provide additional reflective surfaces for the light within grow tent 100.

Figure 3A:
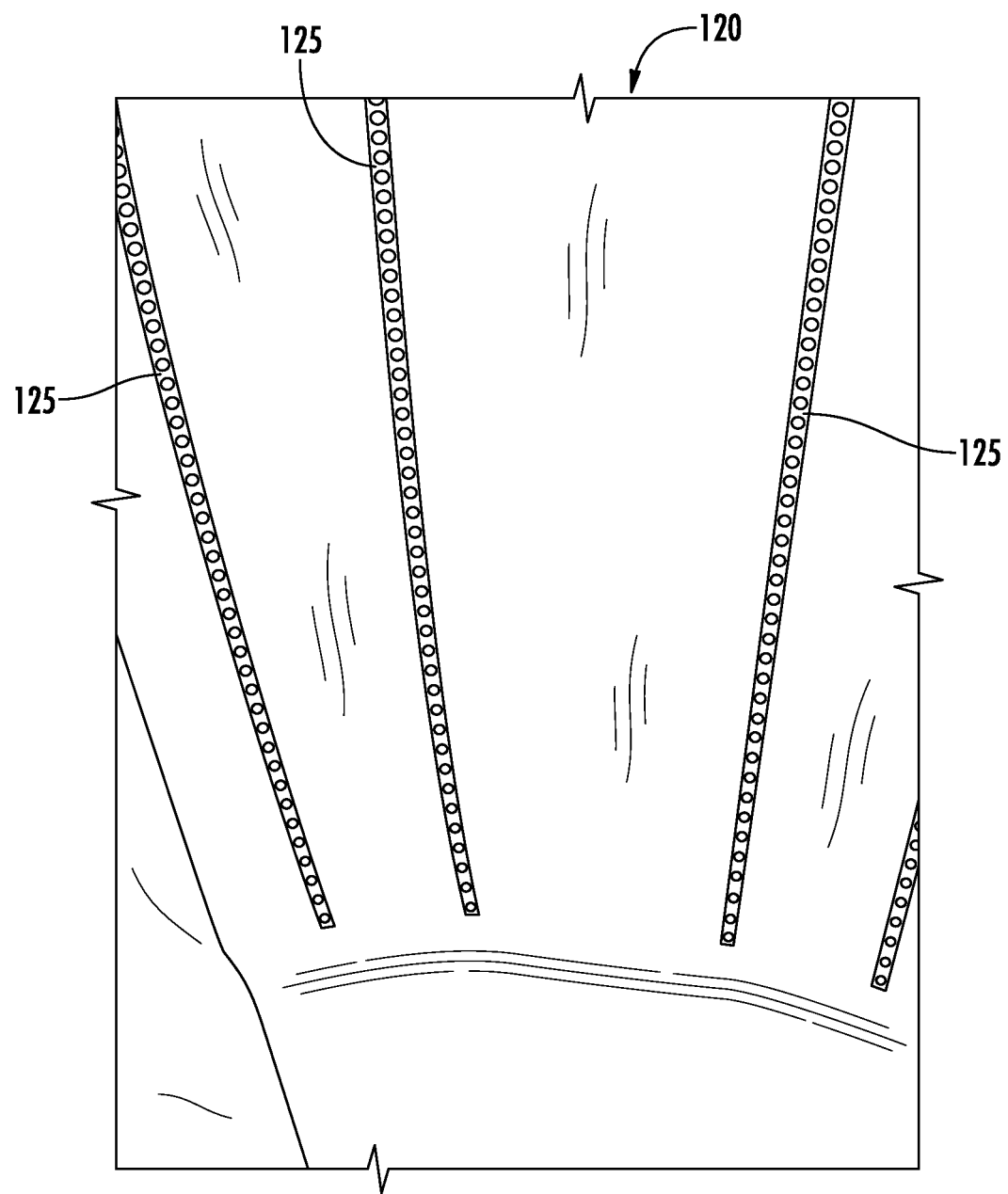
FIG. 3A depicts a sidewall of a grow tent in accordance with an illustrative embodiment of the present disclosure.

In embodiments, light strips 125 are integrated within grow tent 100. Light strips 125 may be secured to grow tent 100 via sewing, adhesive, or any suitable securing means. Because of the relatively low weight of the LED lights that form light strips 125, those of ordinary skill in the art reading this disclosure will appreciate that once inflated, grow tent 100 is self-sustaining and prepared for use, obviating the need for structural frames required to suspend heavier lighting systems and for any form of installation of lighting systems after inflation of grow tent 100. Because light is most intense near the light source and then light intensity decreases with distance following the inverse square law, light within a conventional grow tent has a steep intensity gradient from the top of the grow tent, immediately under the suspended light and the base of grow tent where the plants are located. Plants that grow several feet tall will have intense lighting at the top of the plants and much less light below. Shadowing caused by branches and foliage exacerbate this problem. In contrast, the grow tent described here has LED light strips integrated into the reflective inner surface. The LED light strips of the present disclosure are provided in parallel rows that start along sidewalls 120 near base surface 150 of grow tent 100 and extend towards top surface 140 creating a more even distribution of light, as best seen in FIG. 3A. The uniformity of light distribution is further enhanced within grow tent 100 by the relatively extended surface length of light strips 125 allowing the light to be reflected throughout grow tent 100 by the Mylar inner surface of sidewalls 120. Consequently, in use, plants within grow tents in accordance with the present disclosure are evenly exposed to light at a minimal intensity gradient. In addition, the upper foliage will not be subjected to the greatest light intensity, thereby minimizing overexposure. The distribution of light within grow tent 100 will be further described below.

Figure 4:
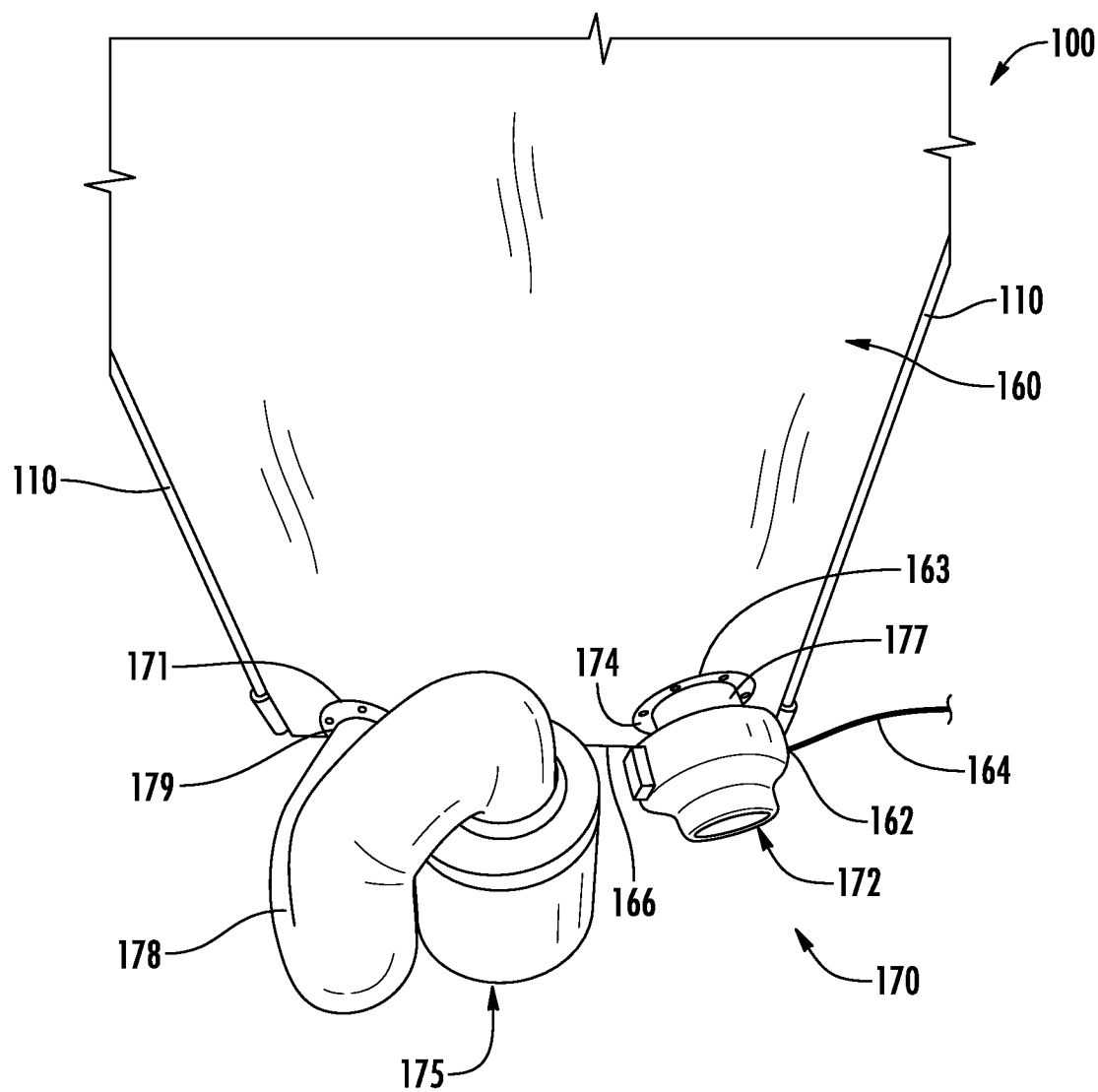
FIG. 4 depicts a rear view of a grow tent in accordance with an illustrative embodiment of the present disclosure.
Figure 4A:
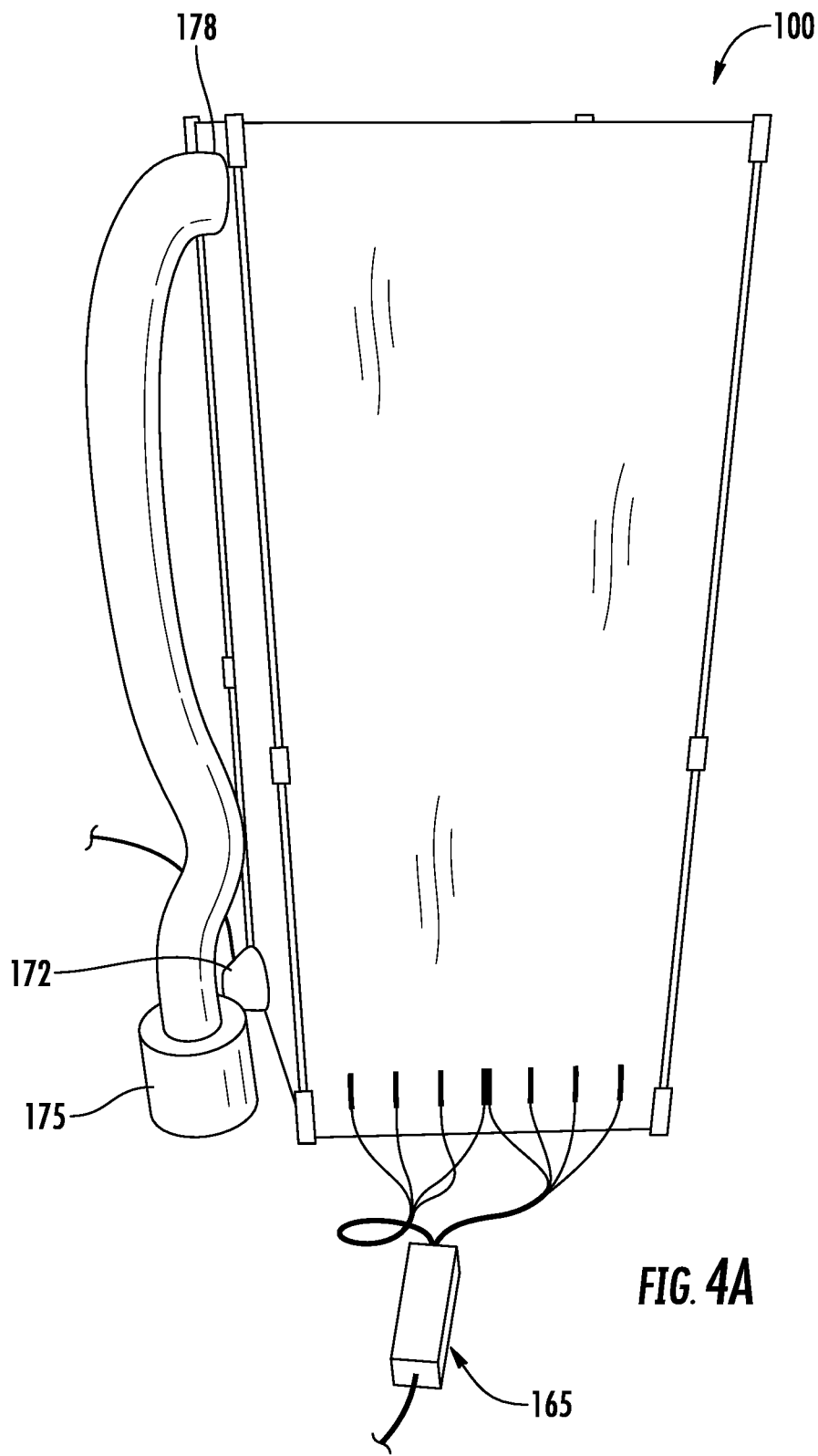
FIG. 4A depicts a rear view of a grow tent in accordance with another illustrative embodiment of the present disclosure.
Figure 5:
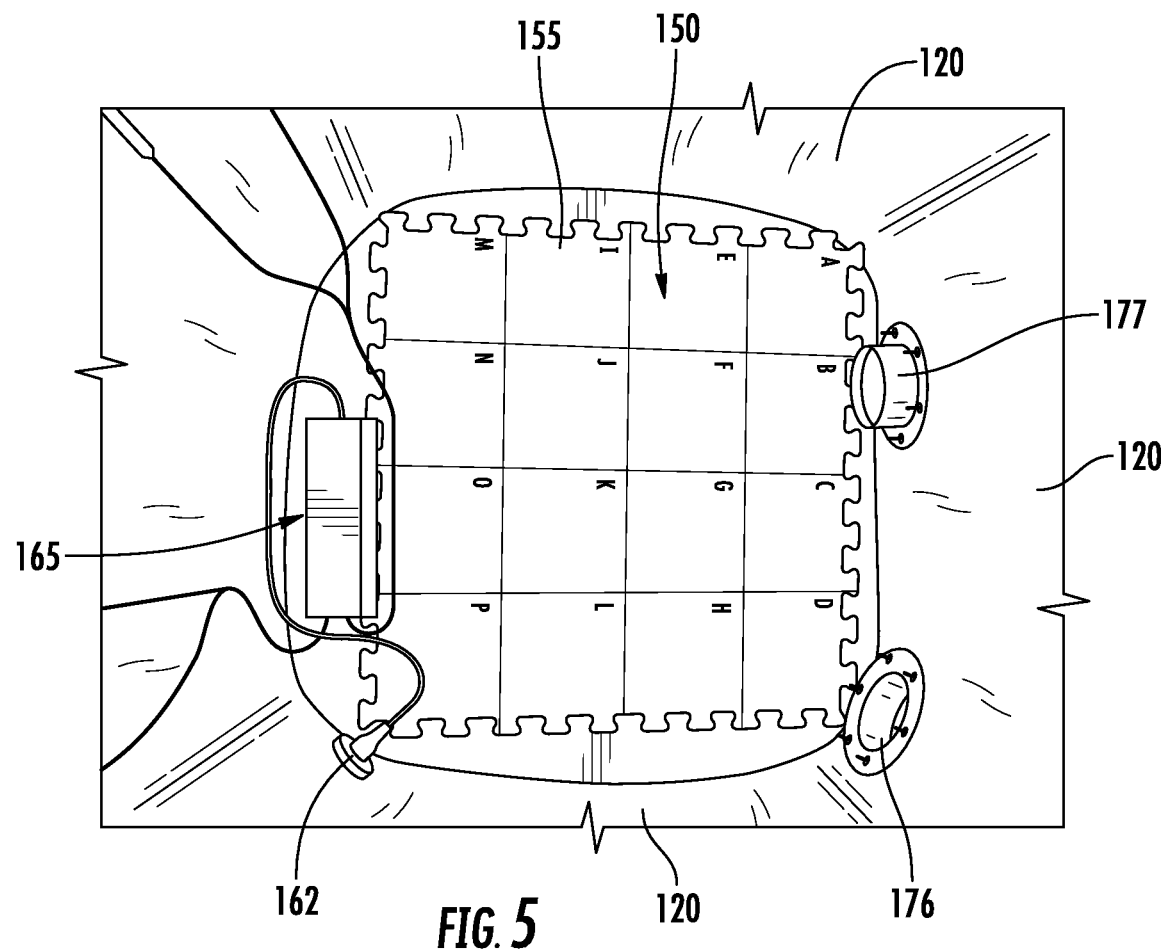
FIG. 5 depicts a top down view of the base of a grow tent in accordance with an illustrative embodiment of the present disclosure.

FIG. 4 illustrates a rear view of rear wall 160 of grow tent 100. Rear wall 160 includes an electrical outlet 162 for receiving a wire 164 connected to a suitable power source 165 (see FIG. 5). Wire 164 provides electricity to power electrical components of grow tent 100. In embodiments, electrical outlet 162 may be installed into a cutout 163 formed near an edge 166 of rear wall 160 adjacent base surface 150. Wires 164 may also run along the perimeter of base surface 150 (as best seen in FIG. 5). In embodiments, rear wall 160 may further include an air circulation assembly 170. Air circulation assembly 170 includes an air blower 172, carbon filter 175, and air ducts 177,178. Air blower 172 is secured to air duct 177 which is fitted into a hole formed on rear wall 160 of grow tent 100. Air duct 177 may be secured within a hole formed on grow tent 100 via a gasket 174 in combination with adhesives, screws, or any other suitable securing means. Air blower 172 provides the air needed to inflate grow tent 100, while also providing for adequate circulation of fresh air and oxygen needed to keep grow tent 100 inflated and functioning throughout use. Carbon filter 175 is to be secured to grow tent 100 by the same means used to secure air blower 172, namely securing carbon filter 175 to an air duct 178 that is secured to a cutout 171 in grow tent 100 via a gasket 179. Carbon filter 175 serves as a ventilation system for moving air out from the interior of grow tent 100 and functions to eradicate odors from grow tent 100. Carbon filter 175 may be a charcoal carbon filter, a centrifugal fan, or any similar device that may function as a ventilation system for grow tent 100. In embodiments, as shown in FIG. 4A, air exhaust duct 178 may be secured to an upper portion of grow tent 100 and may extend in a downward direction towards carbon filter 175 positioned at the base of grow tent 100. Because air blower 172 remains near the base of grow tent 100, this configuration allows for directional airflow driven by the positions of air blower 172 and air exhaust duct 178. Additionally, power source 165 and its connective components may be positioned outside grow tent 100 if additional space is desired within grow tent 100.

FIG. 5 shows a top-down view of the base surface 150 of grow tent 100. Base surface 150 may include a mat 155. In embodiments, mat 155 is rubber to provide a surface that is easy to grip for the contents of grow tent 100 to prevent unwanted movement. As shown in FIG. 5, power source 165 may rest on base surface 150 of grow tent 100. Power source 165 may be a battery, a generator, or any suitable power source for powering the electrical components of grow tent 100.

In addition to removing the need for installation of lighting systems and associated structural frameworks, grow tents in accordance with the present disclosure provide for a more uniform distribution of light intensity within grow tent 100.

Testing of photosynthetic active radiation (PAR) was conducted on a grow tent in accordance with the present disclosure. A 2 foot by 2 foot rubber pad was placed on the base surface inside the grow tent. A grid was drawn on the pad dividing it into 24, 6-inch squares. The integrated LED lights were switched on and allowed to reach a stable operating temperature and intensity for 4 hours before any measurements were taken. An Apogee light meter, model MQ-210, was used for all light measurements and readouts were recorded in units of photosynthetic active radiation (PAR). The light sensor of the PAR meter was fixed onto a 6-inch square tile using double sided tape. The tile was then placed into each square of the grid drawn on the rubber mat and PAR values were recorded at the base of the grow tent and at 12, 24, 36, and 48-inch distance from the base.

A second set of PAR measurements were taken using the same grow tent as used in the first data set to compare the integrated LED lighting system to an incandescent lighting system. The integrated LED lights were switched off and a 120-watt, incandescent grow light in a reflector fixture was secured to the top of the grow tent. The incandescent light was switched on and PAR measurements were recorded for the same data points as outlined in the first data set described above.

The tables shown in FIG. 6-10 depict the photosynthetic active radiation data recorded for a grow tent in accordance with an illustrative embodiment having an integrated LED lighting system, and an incandescent light fixture. Inspection of the tabulated data reveals that the PAR values for the integrated LED system is more consistent and evenly distributed compared to the incandescent light situated at the apex of the interior of the grow tent.

Figures 10, 11:
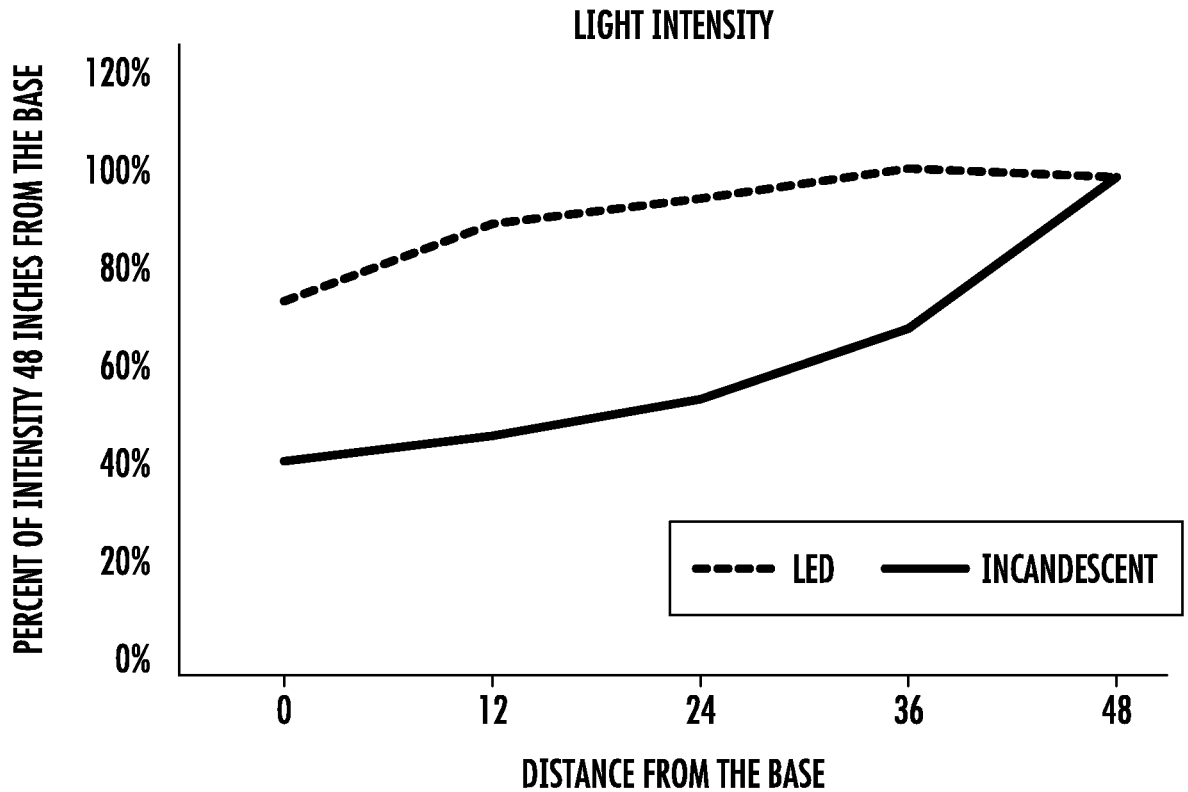
Figure 12:
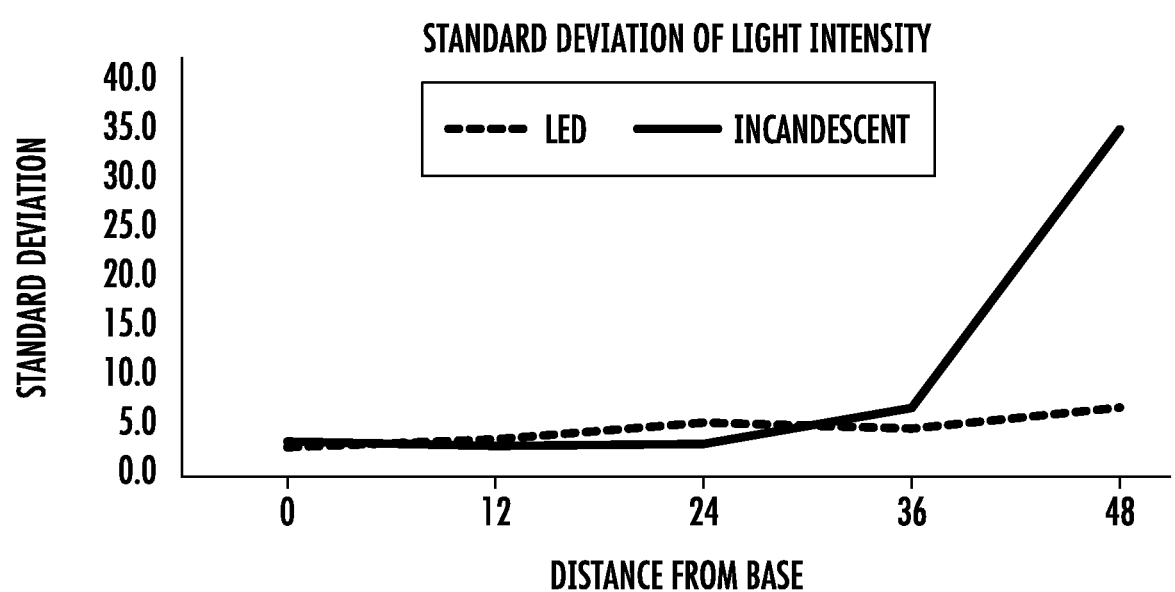
FIG. 12 is a graph depicting the standard deviation of light intensity data for a grow tent in accordance with an illustrative embodiment of the present disclosure having LED lighting compared to known incandescent lighting at varying distances from the base of the grow tent.

These data sets are further illustrated graphically in FIGS. 11 and 12. In FIG. 11, the average PAR values were calculated from each data set at the base of the grow tent and at 12, 24, 36 and 48 inches above the base of the grow tent. The percentage values are comparisons of the average light intensity at each distance from the base compared to the average PAR value for the 48-inch measurements. The plot reveals that the LED system provides a more even distribution of light. Inspection of the data also reveals that the variability of the PAR values is more significant for the incandescent light particularly for the values obtained close to the light source.

In FIG. 12, the standard deviation of the average PAR value was calculated from each data set at the base of the grow tent and at 12, 24, 36 and 48 inches above the base of the grow tent. The lighting system using the LED light strips of the present disclosure provided a standard deviation of average photosynthetic active radiation that ranged from about 2 to about 8, while the standard deviation for the incandescent light is significantly greater as the distance to the light is decreased.

Figure 13:
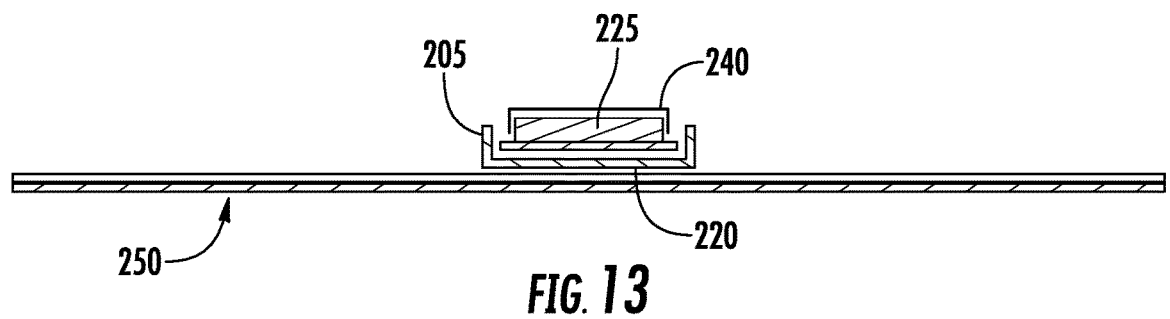
FIG. 13 depicts a diagrammatic cross-sectional view of a sidewall of a grow tent in accordance with a second illustrative embodiment of the present disclosure.
Figure 14:
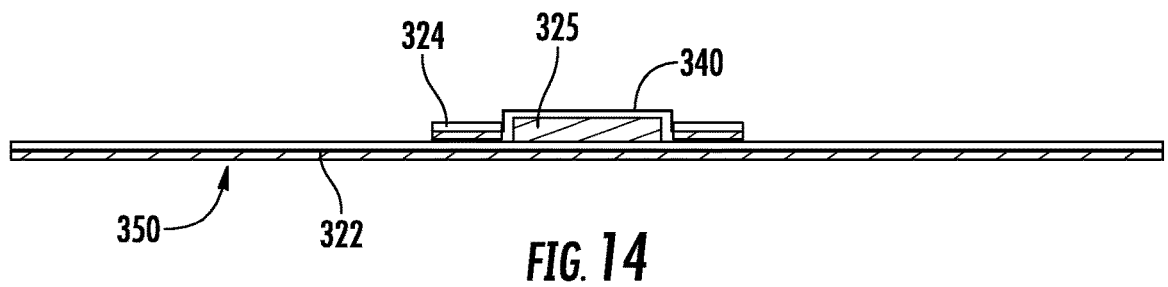
FIG. 14 depicts a diagrammatic cross-sectional view of a sidewall of a grow tent in accordance with a third illustrative embodiment of the present disclosure.
Figure 15:
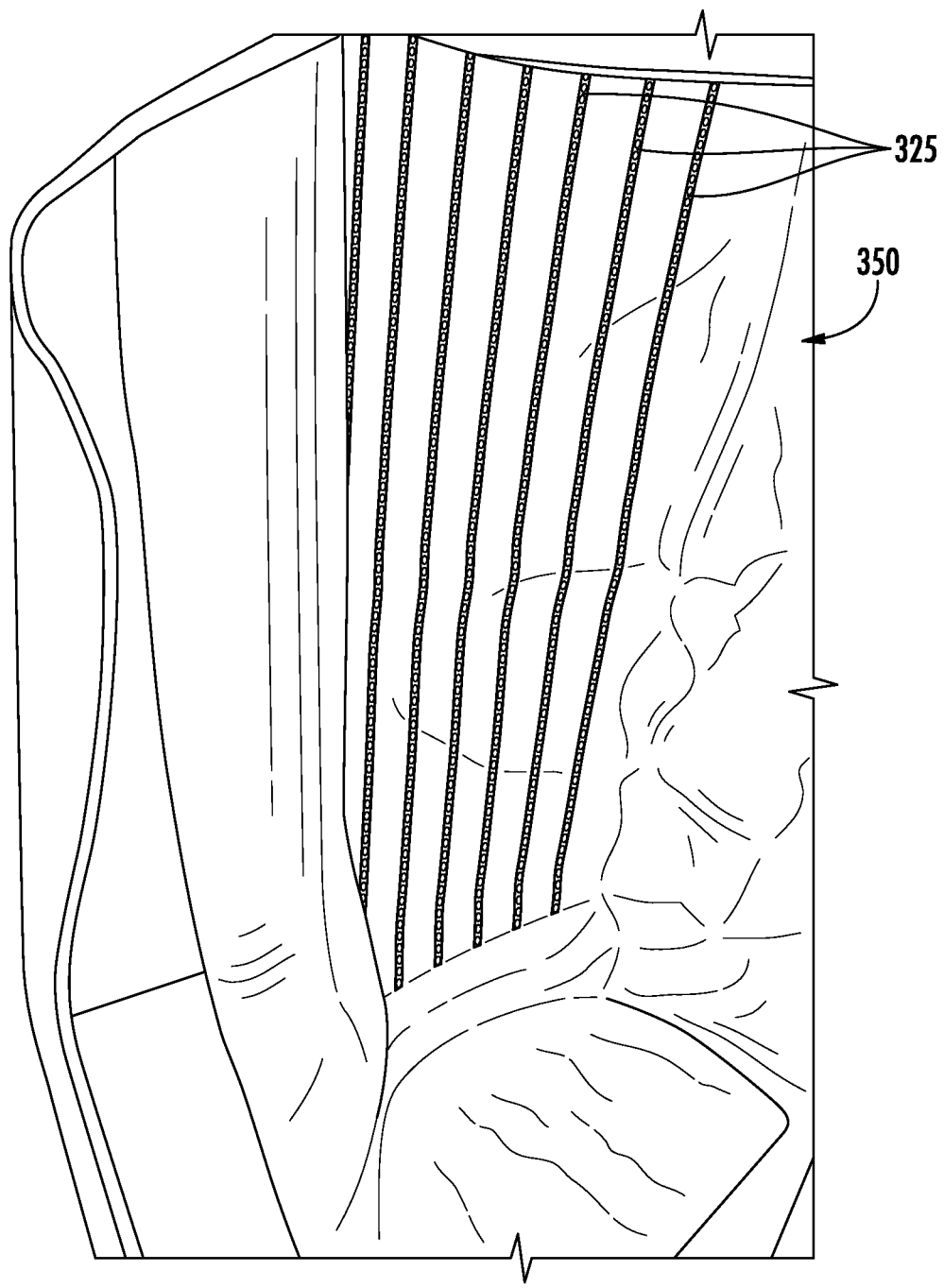
FIG. 15 depicts a sidewall of a grow tent in accordance with an illustrative embodiment of the present disclosure.
Figure 16:
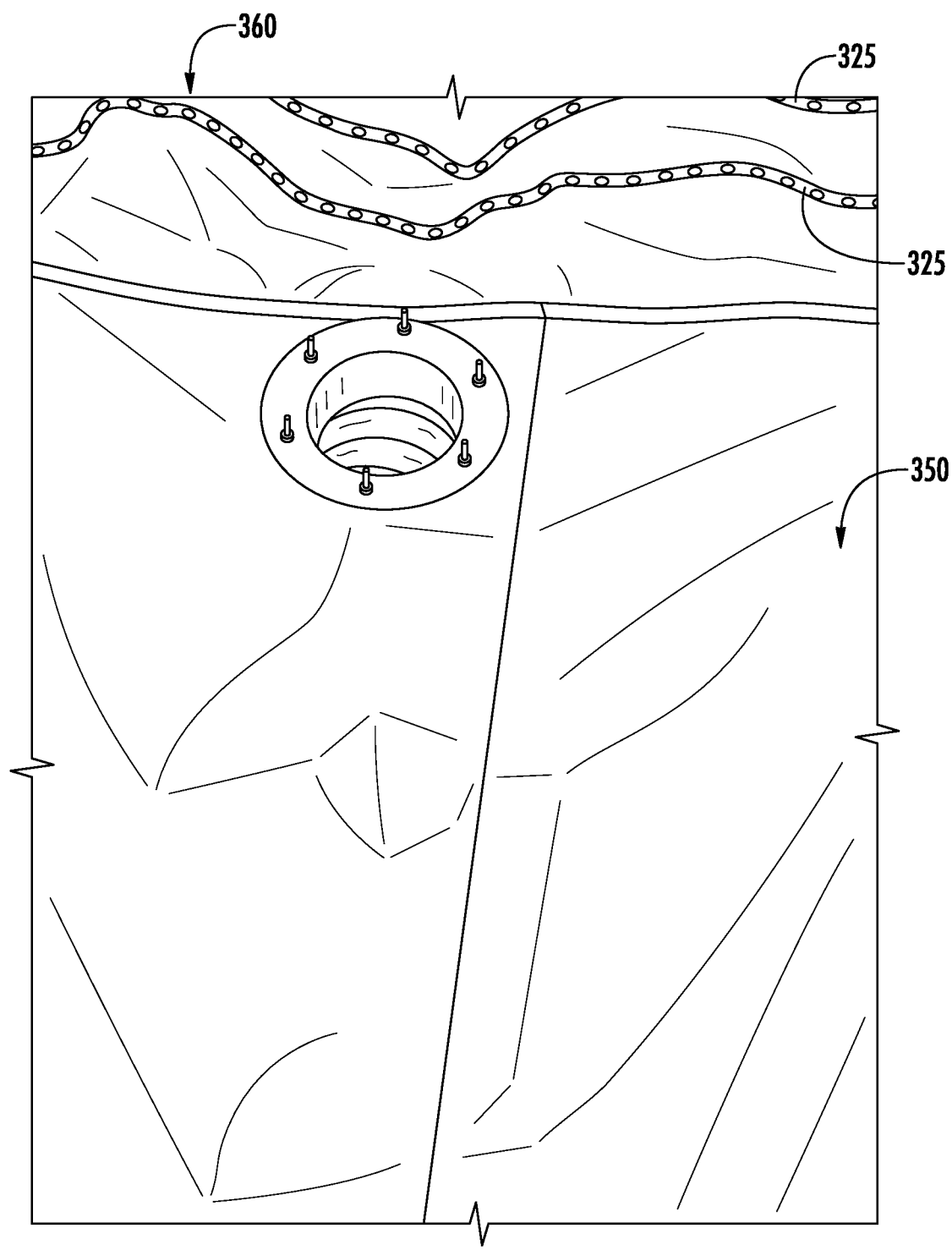
FIG. 16 depicts a sidewall and a top surface of a grow tent in accordance with an illustrative embodiment of the present disclosure.

In an alternative embodiment, as shown in FIG. 13, a sidewall 250 of an illustrative grow tent may include a series of light strips 225 adhered to a base strip 220. Base strip 220 may be configured to engage with a track 205 formed on the grow tent to secure light strips 225 to the grow tent. Track 205 may be formed by sewing or any other suitable process. A coating 240 may be secured to light strips 225. Coating 240 may be waterproof and made from plastic tape, or other suitable plastics or materials. In yet another embodiment, shown in FIG. 14, an illustrative grow tent may include light strips 325 configured to run along the sidewalls 350 of grow tent within a channel 320 formed on grow tent 300. Channel 310 may be formed by sewing or any other suitable process for forming channel 310. In this embodiment, the sidewalls 350 of the grow tent may include mylar-coated canvas having a multiple canvas layers 322 and mylar layers 324 in various alternating or repeating arrangements as desired. As shown in FIGS. 15 and 16, light strips 325 may extend along varying lengths of sidewalls 350 and top surface 360 as desired.

In embodiments 24 volt LED strip lights may be used, such as, for example, SMD2835 24 Watts per meter 6500k color LED strip lights. A grow tent employing SMD2835 24 Watts per meter 6500k color LED lights was found to have an average interior brightness of about 350 PAR compared to 12 volt LED lights that averaged about 70 PAR.

Figure 17:
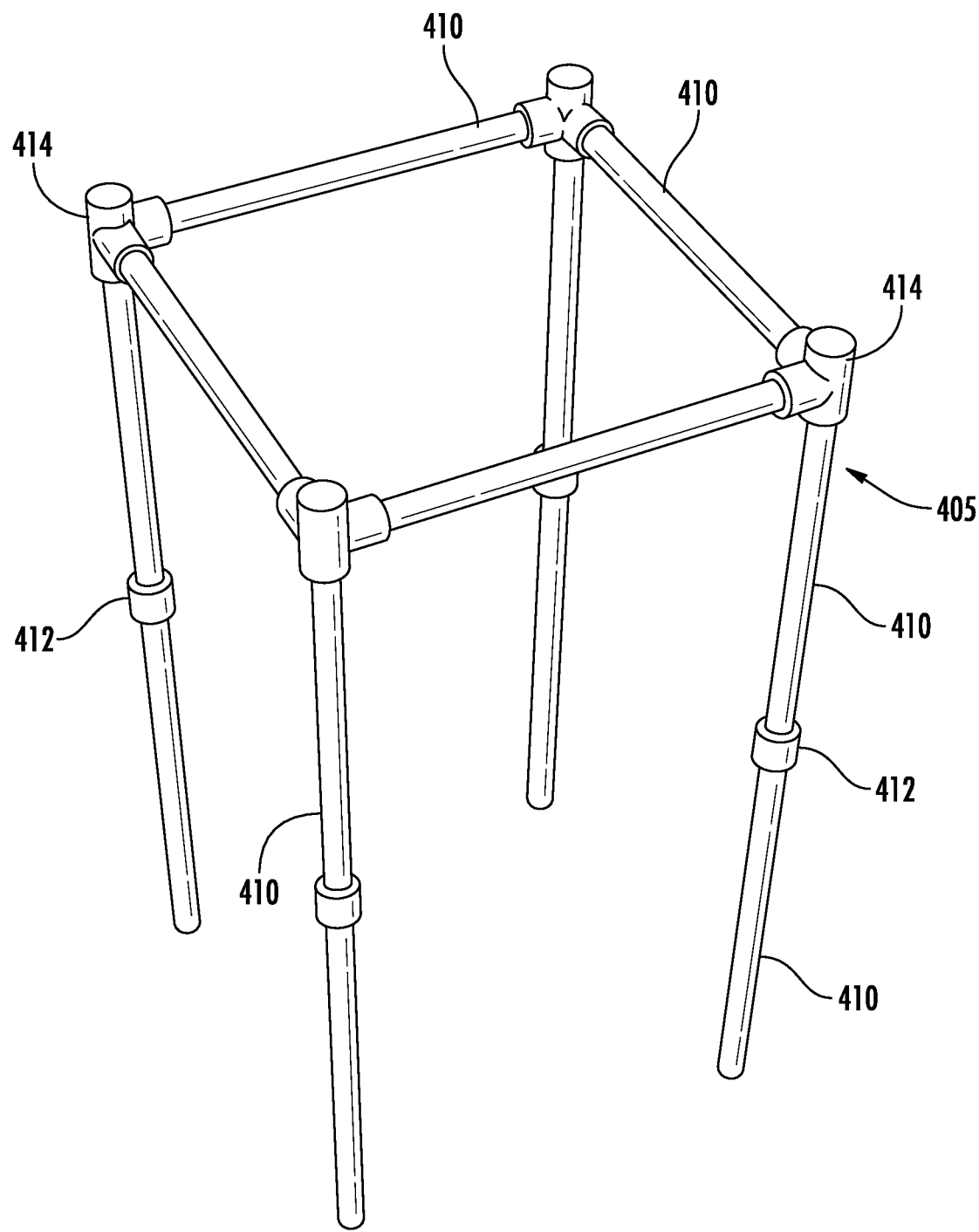
FIG. 17 depicts a metal frame of a grow tent in accordance with an illustrative embodiment of the present disclosure.

In further embodiments, an inflatable grow tent 400 (FIGS. 17-20), may include an external frame 405 made of support rods 410. Support rods 410 may be made from any suitable material, and be of any desired dimensions suitable for providing an exterior frame 405 to support grow tent 400. In embodiments, support rods 410 may be, for example, ¾-inch metal (e.g. aluminum) conduits or polypropylene tubing. As shown in FIG. 17, support rods 410 may be connected to adjacent support rods via connectors. In embodiments, frame 405 may include one or more two-way connectors 412 and one or more three-way connectors 414 as desired. Other types of suitable connectors may be used to connect any number of support rods to provide a desired configuration for frame 405. As in previous embodiments, inflatable tent 400 may include sidewalls 420, a top surface 440 and a base surface (not expressly shown) that may be secured to exterior frame 405 by any suitable means. For example, in embodiments, grommets or fabric loops (not shown) at or near the top of sidewalls 420 may be placed over the tops of support rods 410. Other methods for supporting sidewalls 420 on support rods 410 will be apparent to one skilled in the art reading this disclosure.

Figure 18A:
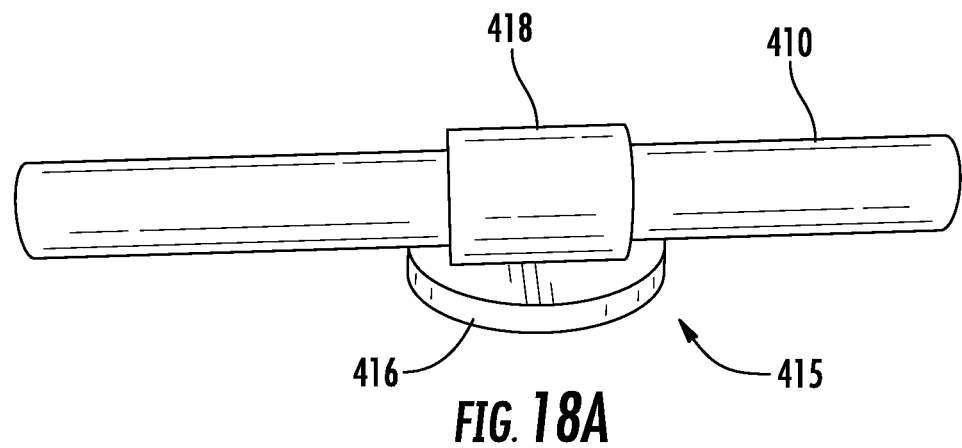
FIGS. 18A and 18B depict an accessory attachment member of a grow tent in accordance with an illustrative embodiment of the present disclosure.
Figure 18B:
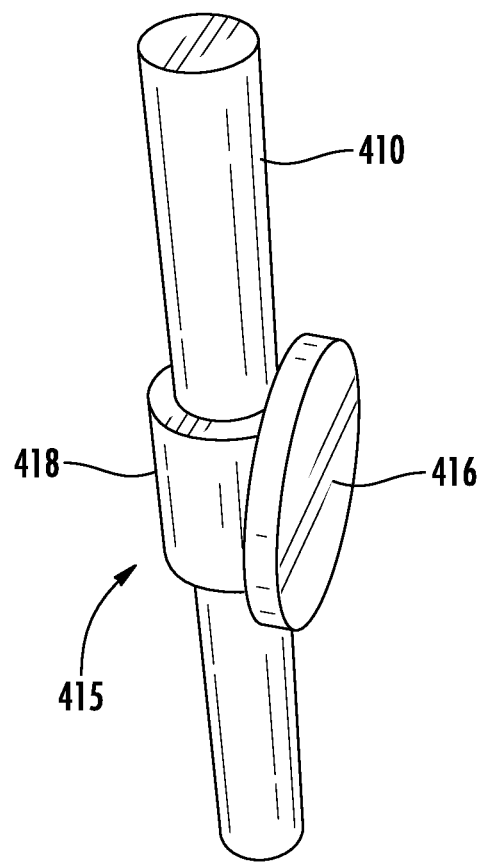
Figure 19:
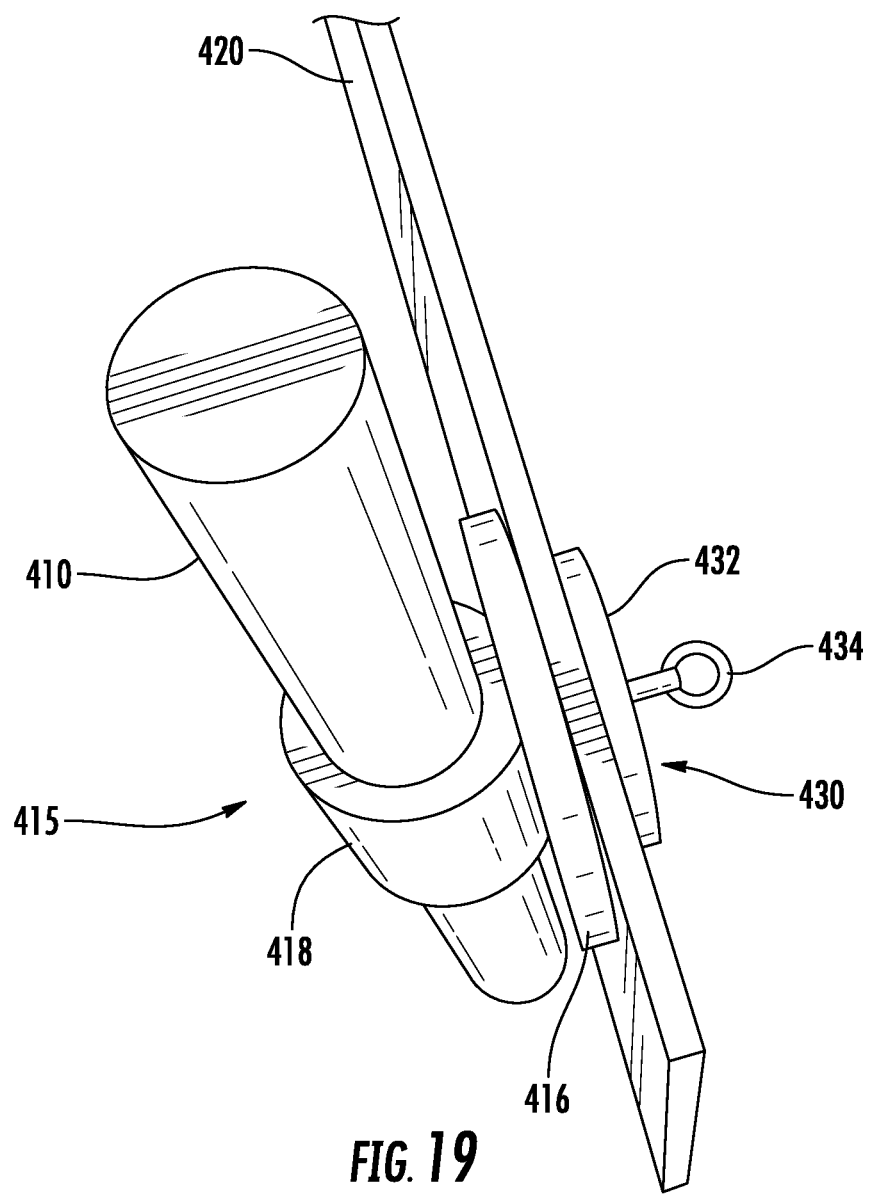
FIG. 19 depicts the sidewall of a grow tent in accordance with an illustrative embodiment of the present disclosure including an accessory attachment member having an accessory attached thereto.
Figure 20:
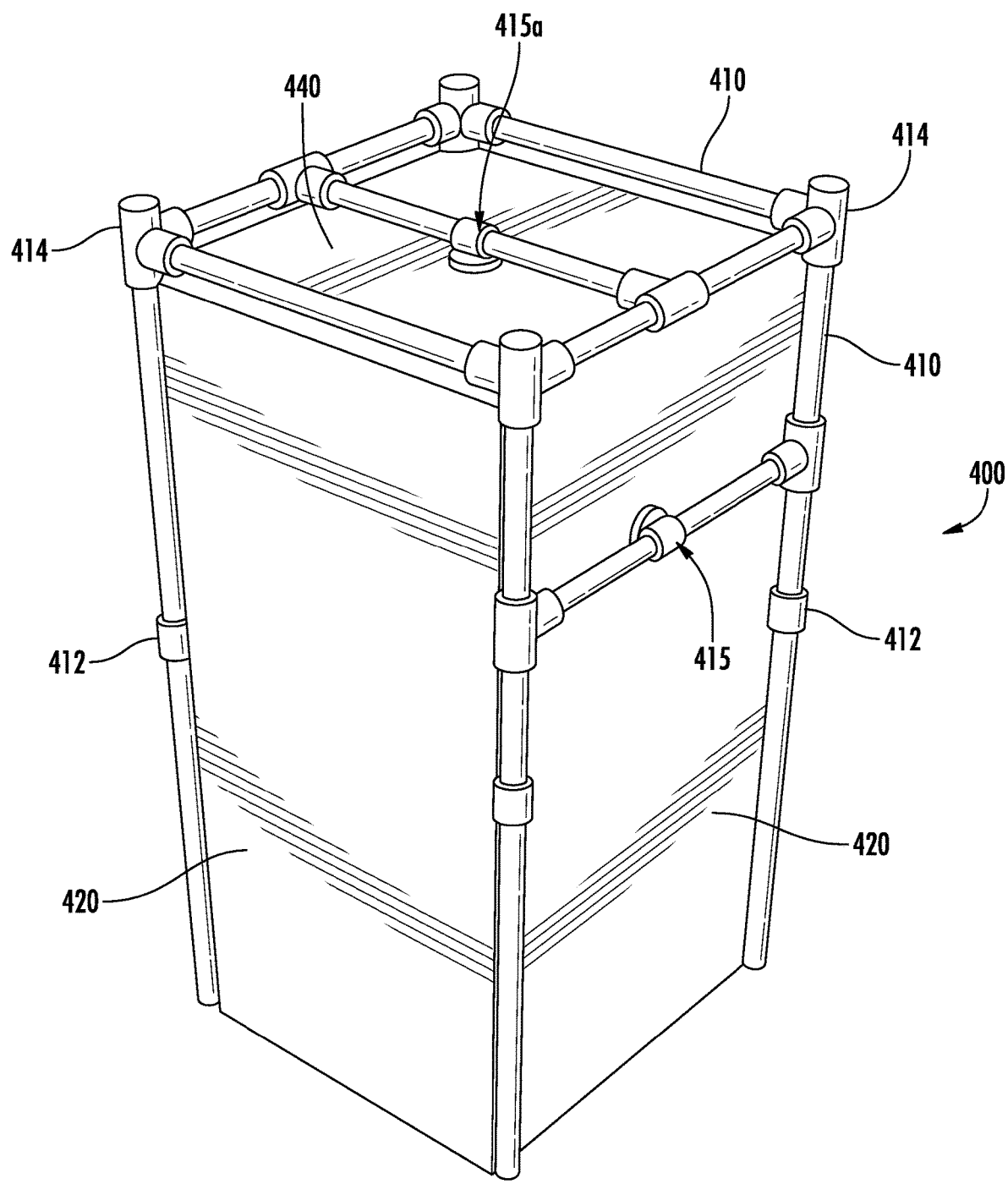
FIG. 20 depicts a grow tent in accordance with an illustrative embodiment of the present disclosure including a metal frame.

In embodiments, grow tent 400 may further include an accessory attachment member 415, including a metal plate 416 positioned on a support 418 (FIGS. 18A and 18B). Support 418 is configured to receive a support rod 410 therethrough. In embodiments, metal plate 416 may be positioned on a connector, provided the connector is positioned at a location at which it is desired to suspend an accessory. As best seen in FIGS. 19 and 20, metal plates 416 may be in contact with, or in close proximity to the exterior of a sidewall 420 of grow tent 400. An accessory 430 having a magnetic portion 432 is positioned in contact with, or in close proximity to the interior of sidewall 420 in alignment with metal plate 416. In this manner, an accessory 430, held in place by the magnetic attraction between magnetic portion 432 of accessory 430 and metal plate 416, may be suspended within the interior of grow tent 400.

In embodiments, the accessory 430 may include a hook or eyelet 434, or any other desired accessories for use within the interior of grow tent 400. A second accessory may be suspended from top surface 440 on the interior of grow tent 400 in a similar manner by magnetic attraction to accessory attachment member 415a. In embodiments, the accessory attachment member may include a magnet and the accessory may include a metal plate. In other embodiments, each of the accessory attachment member and the accessory may include a magnet, the magnets being of opposite polarity to ensure adequate attraction. Once positioned on the interior of grow tent 400, accessory 430 may be used to suspend any type of structure desired within tent 400 (e.g. using wires, strings, or chords (not shown)), and may be capable of supporting 50 pounds or more.

While embodiments of this disclosure have been described, it is not intended that the disclosure be limited thereto, as it is intended that the disclosure be as broad in scope as the art will allow and that the specification be read likewise. Therefore, the above description should not be construed as limiting, but merely as exemplifications of presently disclosed embodiments. Thus, the scope of the embodiments should be determined by the appended claims and their legal equivalents, rather than by the examples given.

Persons skilled in the art will understand that the products and methods specifically described herein are non-limiting exemplary embodiments. The features illustrated or described in connection with one exemplary embodiment may be combined with the features of other embodiments. Various alternatives and modifications can be devised by those skilled in the art without departing from the disclosure. Accordingly, the present disclosure is intended to embrace all such alternatives, modifications and variances. As well, one skilled in the art will appreciate further features and advantages of the present disclosure based on the above-described embodiments. Accordingly, the present disclosure is not to be limited by what has been particularly shown and described, except as indicated by the appended claims.

The invention claimed is:

1. An inflatable grow tent comprising:
   a base surface, a top surface, and a plurality of sidewalls, the sidewalls including an integrated lighting system;
   a plurality of support members configured to structurally support the grow tent;
   an air circulation assembly including an air blower and a carbon filter;
   wherein the integrated lighting system is configured to provide a standard deviation of average photosynthetic active radiation that is from 2 to 8 within the grow tent when the lighting system is active;
   wherein the plurality of support members are tubular conduits that form a frame external of the plurality of sidewalls; and
   an accessory attachment member positioned adjacent an exterior of one of the plurality of sidewalls, the accessory attachment member including a metal plate and a support configured to receive one of the tubular conduits therethrough; and
   further including an accessory positioned adjacent an interior of the one of the plurality of sidewalls in alignment with the accessory attachment member, the accessory including a magnetic portion configured to attach to the metal plate of the accessory attachment member.

2. The inflatable grow tent of claim 1, wherein the sidewalls have an exterior made from canvas.

3. The inflatable grow tent of claim 1, wherein the sidewalls have an interior that is reflective.

4. The inflatable grow tent of claim 3, wherein the interior of the sidewalls comprises Mylar.

5. The inflatable grow tent of claim 1, wherein the lighting system comprises LED lights.

6. The inflatable grow tent of claim 1, wherein the plurality of support members are connected by a plurality of connectors.

7. The inflatable grow tent of claim 1, wherein the accessory includes a hook.

8. An inflatable grow tent comprising:
   a base surface, a top surface, and a plurality of sidewalls, the sidewalls including an integrated lighting system; and
   a plurality of support members configured to structurally support the grow tent;
   wherein the plurality of support members are tubular conduits that form a frame external of the plurality of sidewalls;
   further including an accessory attachment member positioned adjacent an exterior of one of the plurality of sidewalls, the accessory attachment member including a metal plate and a support configured to receive one of the tubular conduits therethrough; and
   further including an accessory positioned adjacent an interior of the one of the plurality of sidewalls in alignment with the accessory attachment member, the accessory including a magnetic portion configured to attach to the metal plate of the accessory attachment member.

9. The inflatable grow tent of claim 8, wherein the sidewalls have an exterior made from canvas.

10. The inflatable grow tent of claim 8, wherein the sidewalls have an interior that is reflective.

11. The inflatable grow tent of claim 10, wherein the interior of the sidewalls comprises Mylar.

12. The inflatable grow tent of claim 8, wherein the lighting system comprises LED lights.

13. The inflatable grow tent of claim 8, wherein the plurality of support members are connected by a plurality of connectors.

14. The inflatable grow tent of claim 8, wherein the accessory includes a hook.

15. The inflatable grow tent of claim 14, further including an air circulation assembly including an air blower and a carbon filter.

16. The inflatable grow tent of claim 15, wherein the integrated lighting system is configured to provide a standard deviation of average photosynthetic active radiation that is from 2 to 8 within the grow tent when the lighting system is active.

\* \* \* \* \*